(No Model.)

S. H. DICKERSON.
THILL COUPLING.

No. 327,868.  Patented Oct. 6, 1885

WITNESSES

INVENTOR
S. H. Dickerson
By C. M. Alexander
his Attorney

UNITED STATES PATENT OFFICE.

SAMUEL H. DICKERSON, OF DAYTON, OHIO, ASSIGNOR OF ONE-HALF TO LOUIS HILLMAN, OF SAME PLACE.

THILL-COUPLING.

SPECIFICATION forming part of Letters Patent No. 327,868, dated October 6, 1885.

Application filed August 10, 1885. Serial No. 173,919. (No model.)

*To all whom it may concern:*

Be it known that I, SAMUEL H. DICKERSON, a citizen of the United States, residing at Dayton, in the county of Montgomery and State of Ohio, have invented certain new and useful Improvements in Thill-Couplings, of which the following is a specification, reference being had therein to the accompanying drawings.

My invention relates to anti-rattlers for thill-couplings for vehicles; and its object, like all other inventions of its class, is to prevent in a simple and effective manner the rattle incident to the wear of bolts and other parts for coupling shafts to vehicles.

Figure 1:
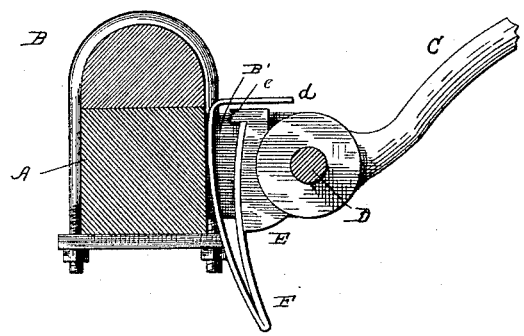
Figure 2:
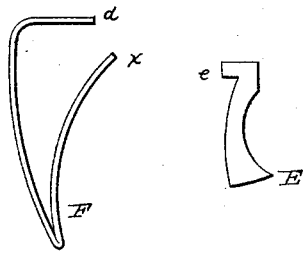

In the accompanying drawings, making part of this specification, Figure 1 represents a cross-section of the shaft of vehicle, clip-shaft, iron bolt, and spring, with its connection for forming the anti-rattler. Fig. 2 represents the spring and the box with which it works as an auxiliary.

In the figures, A represents the axle of the vehicle. This axle is surrounded with the usual clip, B, said clip having ears B' to receive the end of the shaft-iron C.

C represents the shaft-iron, and D the bolt which fastens it between the ears of the clip B.

E represents what I term a "box." This box is a piece of metal of concavo-convex form, having a flange, $e$, at its upper end, which turns backward to the line of draft of the vehicle. The concave portion of this box is made in shape to embrace the rounded rear end of the shaft-iron.

F represents a metallic spring, bent in the form shown, and having a flange or overhanging lip, $d$, at one end, the other end of said spring being left plain.

In the use of this invention the end of the shaft-iron is first inserted between the jaws of the clip and then secured by the bolt D. The box E is then inserted from the under side of the clip, and while embracing the rounded end of the shaft-iron the spring F is driven down behind it until the end $x$ catches under the flange $e$. The lip $d$ will at the same time overlap the top of the box, so that it is kept from moving either way, up or down.

By this arrangement the rattle of the shaft is not only prevented by the spring, but the wear is taken up by the box E, said box being always kept in position by the spring.

The box and spring can of course be removed by removing the bolt D, and thus releasing the shaft-iron.

Having thus fully described my invention, what I claim as new, and desire to secure by Letters Patent, is—

The concavo-convex flanged box E and the spring F, constructed substantially as described, in combination with the clip B of a vehicle and its shaft-iron and bolt, the several parts being connected and used as herein set forth.

In testimony whereof I affix my signature in presence of two witnesses.

SAMUEL H. DICKERSON.

Witnesses:
WM. H. YOUNG,
GEO. R. YOUNG.